(12) United States Patent
Heo (10) Patent No.: US 9,779,099 B2
(45) Date of Patent: Oct. 3, 2017

(54) METHOD OF PROCESSING DATA, AND PHOTOGRAPHING APPARATUS USING THE METHOD

(71) Applicant: HANWHA TECHWIN CO., LTD., Changwon-Si (KR)

(72) Inventor: Joon-Young Heo, Changwon (KR)

(73) Assignee: Hanwha Techwin Co., Ltd., Changwon-Si (KR)

( * ) Notice: Subject to any disclaimer, the term of this patent is extended or adjusted under 35 U.S.C. 154(b) by 287 days.

(21) Appl. No.: 13/953,986

(22) Filed: Jul. 30, 2013

(65) Prior Publication Data

US 2014/0237005 A1    Aug. 21, 2014

(30) Foreign Application Priority Data

Feb. 18, 2013 (KR) .................. 10-2013-0016980

(51) Int. Cl.
*G06F 17/30* (2006.01)
*G11B 27/30* (2006.01)

(52) U.S. Cl.
CPC .... *G06F 17/3007* (2013.01); *G06F 17/30076* (2013.01); *G11B 27/3027* (2013.01)

(58) Field of Classification Search
CPC ........... G06F 17/3012; G06F 17/30014; G06F 17/30017
USPC ......................................... 707/821
See application file for complete search history.

(56) References Cited

U.S. PATENT DOCUMENTS

| | | | | |
|---|---|---|---|---|
| 6,979,769 | B1* | 12/2005 | Majima ................ | G10H 1/0066 434/307 A |
| 2001/0043801 | A1* | 11/2001 | Komori ................ | H04N 21/218 386/235 |
| 2003/0158913 | A1* | 8/2003 | Agnoli et al. ................ | 709/219 |
| 2004/0255338 | A1* | 12/2004 | Agnoli ..................... | H04N 7/54 725/136 |
| 2007/0005795 | A1* | 1/2007 | Gonzalez ...................... | 709/232 |
| 2009/0109333 | A1 | 4/2009 | Fushimi | |
| 2009/0282077 | A1* | 11/2009 | Thomas ..................... | 707/104.1 |
| 2010/0061455 | A1* | 3/2010 | Xu ......................... | H04N 19/51 375/240.13 |
| 2010/0185776 | A1* | 7/2010 | Hosur ................... | H04L 65/602 709/231 |
| 2011/0219098 | A1* | 9/2011 | Xu ................... | H04N 21/85406 709/219 |

(Continued)

FOREIGN PATENT DOCUMENTS

| | | |
|---|---|---|
| JP | 10-232918 A | 9/1998 |
| KR | 10-2009-0042189 A | 4/2009 |

(Continued)

*Primary Examiner* — Alexander Khong
(74) *Attorney, Agent, or Firm* — Sughrue Mion, PLLC (57) ABSTRACT

Disclosed is a method of data processing in an apparatus such as a photographing apparatus. The method includes: determining a file format to record data among a plurality of file formats comprising a dedicated file format and a common file format; recording the data in a file of the common file format and generating an auxiliary file corresponding to the file of the common file format, if the common file format is determined; and recording, in the auxiliary file, information about the dedicated file format and recording information for reading the data in the file of the common file format.

14 Claims, 11 Drawing Sheets

(56) References Cited

U.S. PATENT DOCUMENTS

2011/0246673 A1* 10/2011 Kishore ............... H04L 65/602
                                                              709/247
2014/0108568 A1*  4/2014 Lee ............................. 709/206
2015/0309998 A1* 10/2015 Perumanam ........ G06F 17/3002
                                                              707/741

FOREIGN PATENT DOCUMENTS

KR    10-2010-0068800 A    6/2010
KR        10-1070901 B    10/2011

* cited by examiner

METHOD OF PROCESSING DATA, AND PHOTOGRAPHING APPARATUS USING THE METHOD

CROSS-REFERENCE TO RELATED PATENT APPLICATION

This application claims priority from Korean Patent Application No. 10-2013-0016980, filed on Feb. 18, 2013, in the Korean Intellectual Property Office, the disclosure of which is incorporated herein in its entirety by reference.

BACKGROUND

1. Field

Methods and apparatuses consistent with exemplary embodiments relate to recording data, and more particularly, to recording data in a file of a dedicated file format or a common file format.

2. Description of the Related Art

A photographing apparatus, for example, a surveillance camera, may record moving-image data captured by the surveillance camera in a moving-image file and transmit the moving-image data to a computer through a network. The photographing apparatus having such a function is generally called a network camera, and is used in a surveillance system such as a closed-circuit television (CCTV).

Figure 1:
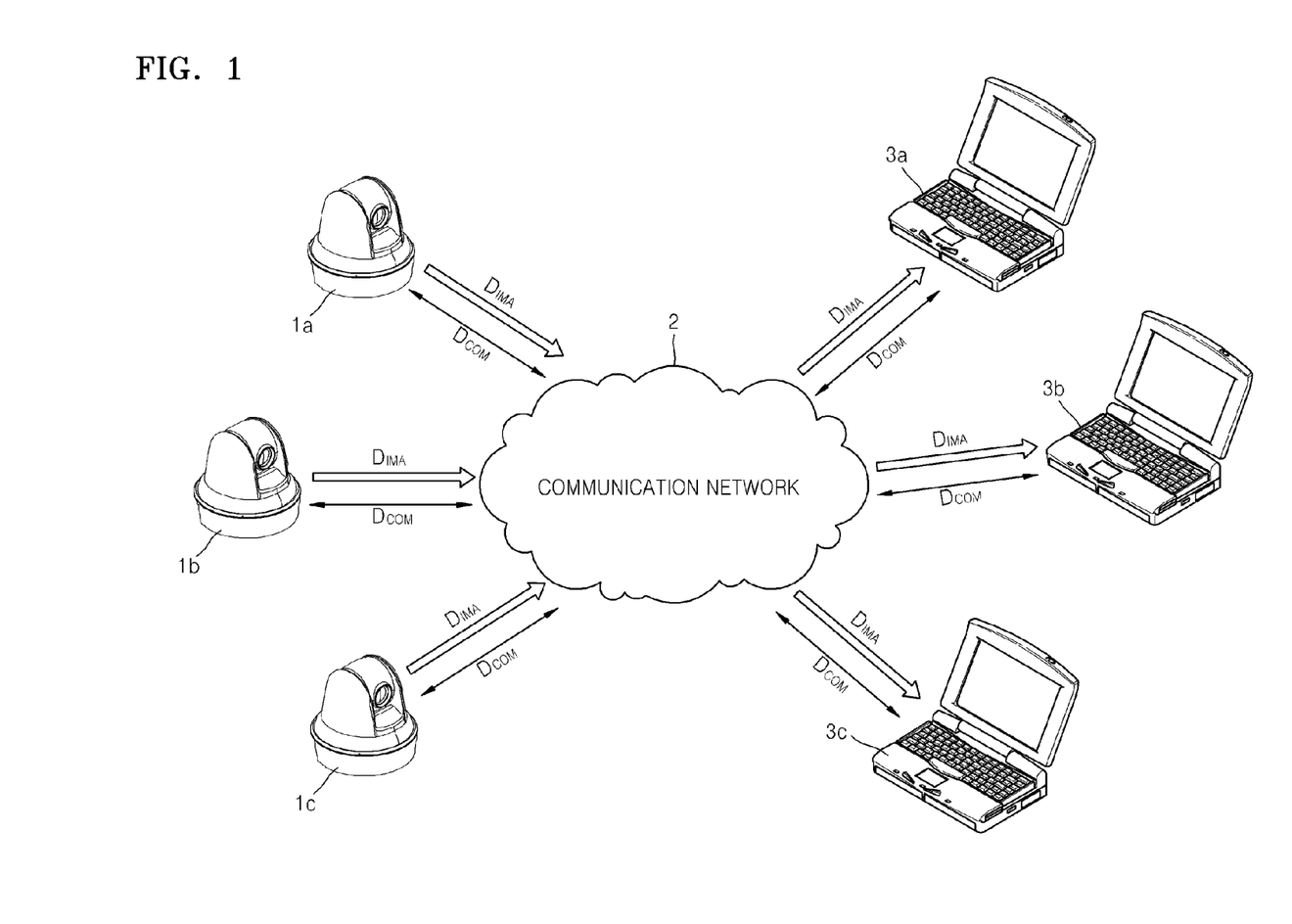
FIG. 1 is a diagram illustrating photographing apparatuses communicating with computers through a communication network, according to an exemplary embodiment.

FIG. 1 shows that photographing apparatuses 1a, 1b and 1c communicate with computers 3a, 3b and 3c through the communication network 2.

Referring to FIG. 1, the photographing apparatus 1a, 1b and 1c communicate with the computers 3a, 3b and 3c through a communication channel $D_{COM}$, and record moving-image data in a moving-image file and transmit the moving-image-data to the computers 3a, 3b and 3c through an image-data channel $D_{IMA}$.

Here, the computers 3a, 3b and 3c are operated by a dedicated program for security, and thus, the photographing apparatuses 1a, 1b and 1c should transmit moving-image data in a dedicated file format in a streaming scheme. Here, the streaming scheme refers to playing or presenting the moving-image data at a receiver such as the computers 3a, 3b and 3c while the moving-image data is being transmitted from a transmitter such as the photographing apparatus 1a, 1b and 1c. Generally, the dedicated file format has an extension "dat" in a file name. On the other hand, some examples of a common file format are Audio Video Interleaved (AVI), MatrosKa Video (MKV), Moving Picture Experts Group-4 (MPEG-4), Window Media Video (WMV) and MPEG-3.

Each of the photographing apparatuses 1a, 1b and 1c records moving-image data in a moving-image file within a memory, for example, a secure digital (SD) card.

When moving-image data is recorded in each of the photographing apparatuses 1a, 1b and 1c, the moving-image data is recorded in only a moving-image file of one of a dedicated file format or a common file format. However, the following problems occur in recording the moving-image data in a dedicated file format or a common file format.

First, if moving-image data is recorded in only a moving-image file of a common file format in a recording medium of a photographing apparatus, the moving-image data may be recorded in various replay devices, and thus, security is weak.

Second, if moving-image data is recorded in only a moving-image file of a dedicated file format in a recording medium of a photographing apparatus, a computer cannot directly replay the moving-image file contained in the recording medium. That is, if the photographing apparatus is broken, the moving-image file of the dedicated file format cannot be replayed.

However, when moving-image data is recorded in a moving-image file of a common file format, the computer 3a, 3b or 3c connected to the photographing apparatus 1a, 1b or 1c through a communication network 2 cannot receive the file in a streaming scheme.

This is because the computers 3a, 3b and 3c replay or analyze a moving-image file by using a dedicated program for security, and thus, only moving-image data in the dedicated file format may be received in a streaming scheme from the photographing apparatuses 1a, 1b and 1c.

However, if moving-image data is recorded in a moving-image file of a common file format, the same moving-image data may not be recorded along with a moving-image file of a dedicated file format because this would cause a capacity problem to arise in the recording medium.

SUMMARY

One or more exemplary embodiments provide a method of recording data in a file of a dedicated file format or a common file format according to a user's selection, and a photographing apparatus using this method, and if data is recorded in a file of a common file format, the file is intended to be externally transmitted as streaming data of the dedicated file format while not causing a capacity problem to arise in recording media.

According to an aspect of an exemplary embodiment, there is provided a method of data processing including: determining a file format to record data among a plurality of file formats comprising a dedicated file format and a common file format; recording the data in a file of the common file format and generating an auxiliary file corresponding to the file of the common file format, if the common file format is determined; and recording, in the auxiliary file, information about the dedicated file format and recording information for reading the data in the file of the common file format.

The method may further include: reading the data in the file of the common file format using the recording information; and transmitting the read data and the information about the dedicated file format, wherein, in the recording the data in the file of the common file format, the data is recorded in a memory of a photographing apparatus which obtains the data, and wherein, in the transmitting the read data, the read data is transmitted from the photographing apparatus to a server computer through a network. The transmission may be performed in a streaming scheme The dedicated file format may be a format where frame headers and the data are alternately disposed.

Each of the frame headers may have the same information in the dedicated file format.

The method may further include recording the data in a file of the dedicated file format if the dedicated file format is determined in the determining a file format, wherein the auxiliary file comprises frame headers formed in the dedicated file format.

The data may include video data and audio data, wherein the recording information for reading the data in the file of the common file format includes an index value and an offset position value of the file of the common file format.

The dedicated file format may be a file format having a file extension "dat" for the file, and wherein the common file format is one of AVI, MKV, MPEG-4, WMV and MPEG-3.

The dedicated file format may be a format where frame headers and the data are alternately disposed.

The information about the dedicated file format may include: information indicating a first position of the frame; an index value of the file of the dedicated file format; a codec format of the data; an offset position value of the file of the dedicated file format; and a total size value of the data.

According to an aspect of another exemplary embodiment, there is provided a photographing apparatus including: an input unit configured to receive data; and a signal processor configured to determine a file format to record the data among a plurality of file formats comprising a dedicated file format and a common file format, record the data in a file of the common file format, and generate an auxiliary file corresponding to the file of the common file format if the common file format is determined, wherein the signal processor is further configured to record, in the auxiliary file, information about the dedicated file format and record information for reading the data in the file of the common file format.

The signal processor may be further configured to read the data in the file of the common file format using the recording information, and transmit the read data and the information about the dedicated file format to a server computer through a network.

The signal processor may be further configured to transmit the read data and the information about the dedicated file format to the server computer through the network in a streaming scheme.

The dedicated file format may be a format where frame headers and the data are alternately disposed.

BRIEF DESCRIPTION OF THE DRAWINGS

The above and other aspects will become more apparent by describing in detail exemplary embodiments with reference to the attached drawings, in which.

DETAILED DESCRIPTION OF THE EXEMPLARY EMBODIMENTS

The attached drawings for illustrating exemplary embodiments are referred to in order to gain a sufficient understanding of inventive concept, the merits thereof, and the objectives accomplished by the implementation of the inventive concept.

Hereinafter, the inventive concept will be described in detail by explaining exemplary embodiments with reference to the attached drawings. Like reference numerals in the drawings denote like elements.

Figure 2:
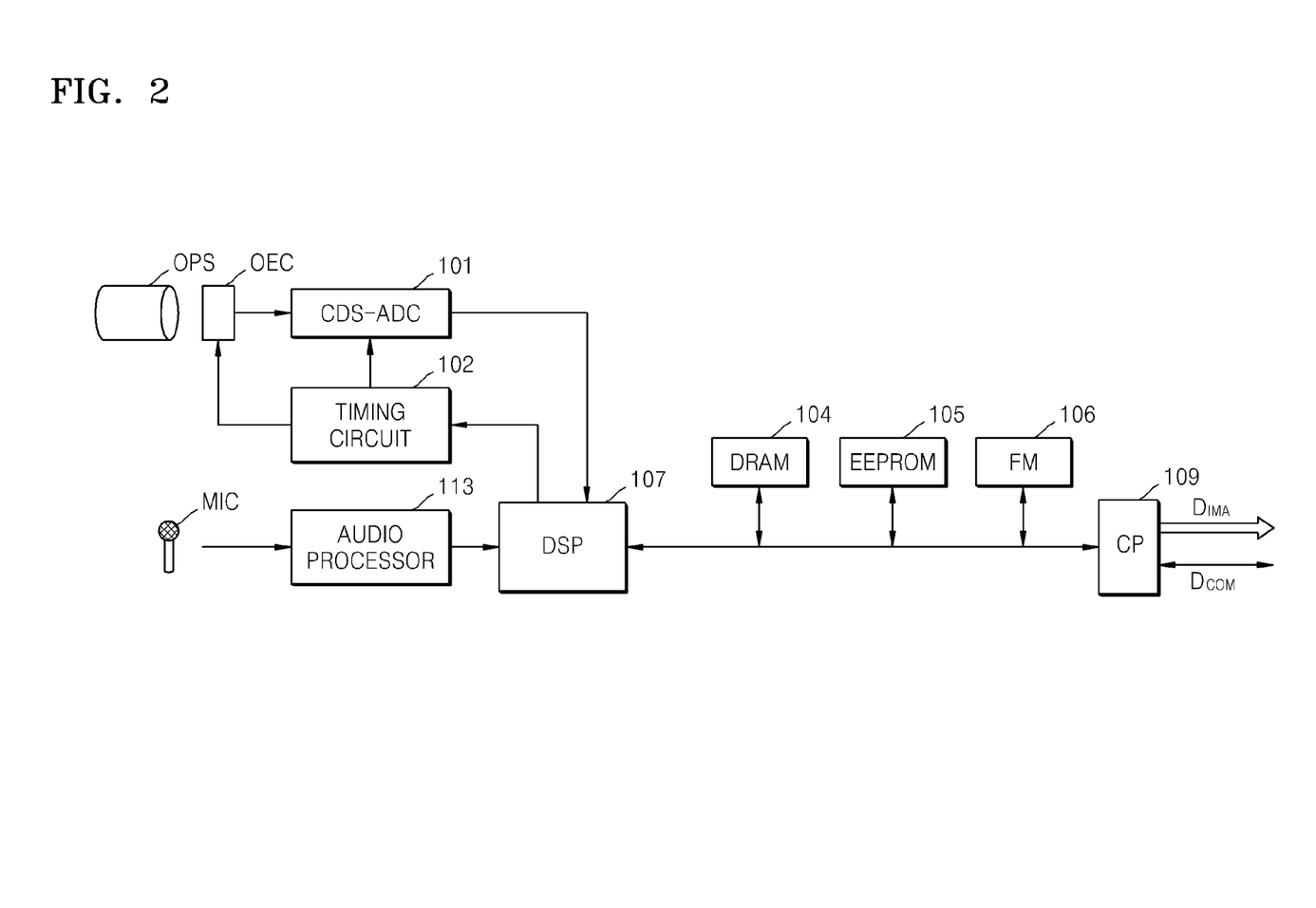
FIG. 2 is a block diagram illustrating a photographing apparatus, according to an exemplary embodiment.

FIG. 2 is a block diagram illustrating a photographing apparatus of an exemplary embodiment.

Referring to FIG. 2, a photographing apparatus according to an exemplary embodiment, for example, a network camera, may include an optical system (OPS), an optical-to-electrical converter (OEC), a correlation double sampler and analog-to-digital converter (CDS-ADC) 101, a timing circuit 102, a dynamic random access memory (DRAM) 104, an electrically erasable and programmable read only memory (EEPROM) 105, a flash memory 106, a digital signal processor (DSP) 107 as a controller, a communication port 109, a microphone (MIC) and an audio processor 113.

The optical system (OPS) including a lens unit and a filter unit optically processes light from a subject.

The optical-to-electrical converter (OEC) including a charge coupled device (CCD) or the complementary metal-oxide-semiconductor (CMOS) converts light from the OPS to electric analog signals. Here, the DSP 107 acts as the main controller and controls the timing circuit 102 to control operation of the OEC and the CDS-ADC 101. The CDS-ADC 101 as the analog-digital converter processes analog image signals from the OEC, removes the high frequency noise and adjusts the amplitude, and converts the analog image signals into digital image data. The digital image data is input to the DSP 507.

The DSP 107 for performing overall control processes digital signals from the CDS-ADC device 101, and generates digital image data classified as luminance and chrominance signals.

The audio processor 513 outputs voice signals from the microphone (MIC) to the signal processor 507.

Digital image data from the DSP 107 is temporarily stored in the dynamic random access memory (DRAM) 104. An algorithm necessary for operation of the DSP 107 is stored in the electrically erasable and programmable read only memory (EEPROM) 105.

The DSP 107 generates a file of one of a plurality of file formats including a dedicated file format and a common file format within a flash memory (FM) 106, for example, a secure digital (SD) card, according to a user's selection, and records data obtained by the DSP 107 in the generated file. Here, a user's selection signal may be provided from a computer (3a, 3b or 3c of FIG. 1).

A data recording method performed by the DSP 107 will be described in detail with reference to FIGS. 5 to 14. Here, data obtained and recorded by the DSP 107 includes at least video data and audio data. The video data and the audio data in the present embodiment may be compressed.

Furthermore, the DSP 107 communicates with the computers (3a, 3b and 3c of FIG. 1) through a communication channel $D_{COM}$ of the communication port 109, and transmits data obtained in a real-time basis to the computers 3a, 3b and 3c through an image data channel $D_{IMA}$ of the communication port 109. Here, at least one of the computers 3a, 3b and 3c may be a server computer.

Here, the computers 3a, 3b and 3c are operated according to a dedicated program for security, and thus, the DSP 107 should transmit data in a dedicated file format in a streaming scheme.

Figure 3:
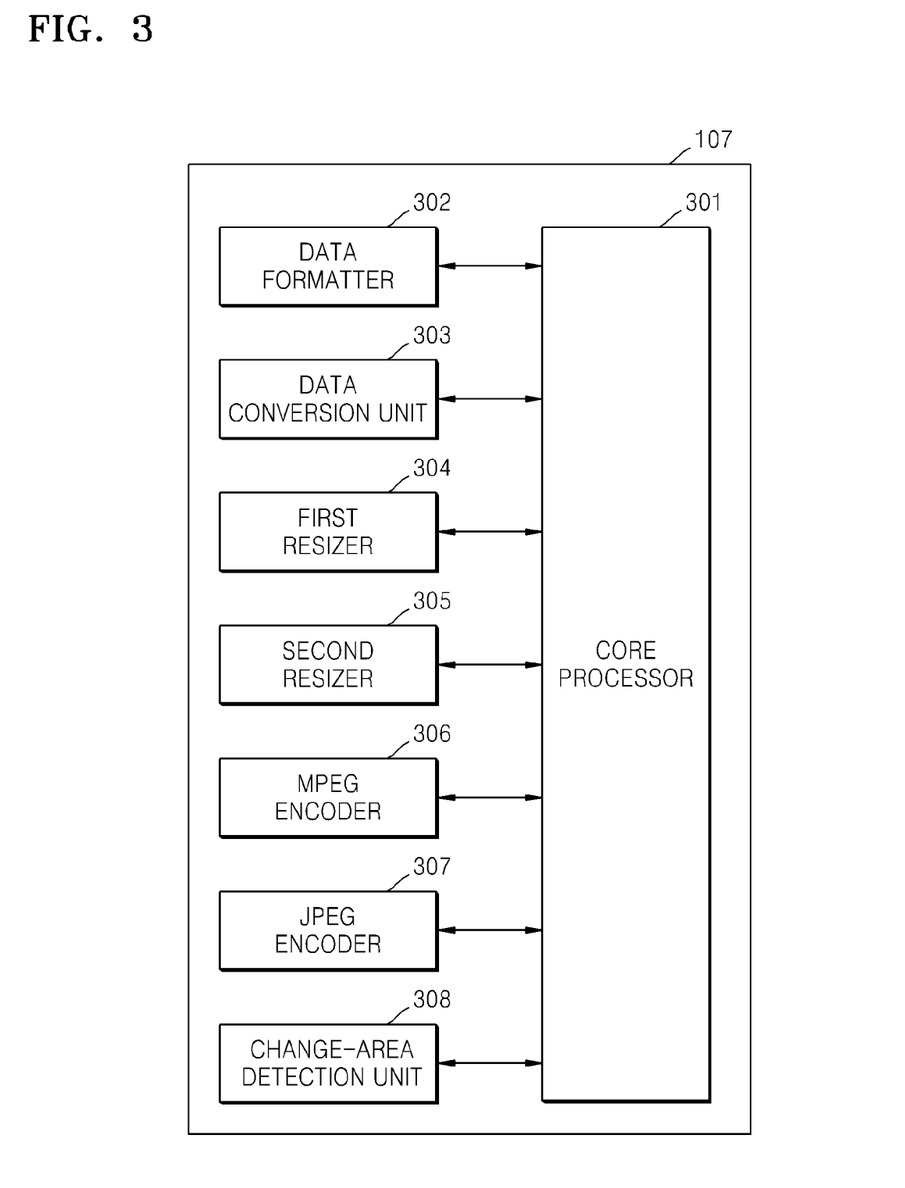
FIG. 3 is a block diagram illustrating an internal configuration of a digital signal processor (DSP) of FIG. 2, which acts as a controller, according to an exemplary embodiment.

FIG. 3 is a block diagram illustrating an internal configuration of a DSP 107 as a controller of FIG. 2.

Referring to FIG. 3, the DSP 107 of FIG. 2 includes a data formatter 302, a data conversion unit 303, a plurality of resizers 304 and 305, a moving picture experts group (MPEG) encoder 306, a joint photographic experts group (JPEG) encoder 307, a change-area detection unit 308 and a core processor 301.

Here, the motion joint photographic experts group (MJPEG) encoder, etc. may be used instead of the MPEG encoder 306. Furthermore, a well-known audio encoder may be added to the DSP 107.

The data formatter 302 operated under the control of the core processor 301 aligns the digital image data from the CDS-ADC (101 of FIG. 2) as the analog-digital converter so that the digital image data fits the storage format of the DRAM 104.

The data conversion unit 303 operated by the control of the core processor 301 converts digital image data of red (R), green (G) and blue (B) format into digital image data of luminance (Y) and color difference (Cb, Cr) format.

A plurality of resizers 304 and 305 operated according to the control of the core processor 301 converts the resolution of digital image data from the CDS-ADC 101. FIG. 3 illustrates only two resizers 304 and 305. However, the two resizers may be integrated into a single resizer, or more than two resizers may be provided, according to exemplary embodiments.

The MPEG encoder 306 is a video encoder, which is operated by the control of the core processor 301 and compresses video data of a live view from the CDS-ADC 101.

The JPEG encoder 460 is a still image encoder, which is operated under the control of the core processor 301 and compresses still image data from the CDS-ADC 501.

The change-area detection unit 308 analyzes live-view video data from the CDS-ADC 101 and detects a change-area.

Figure 4:
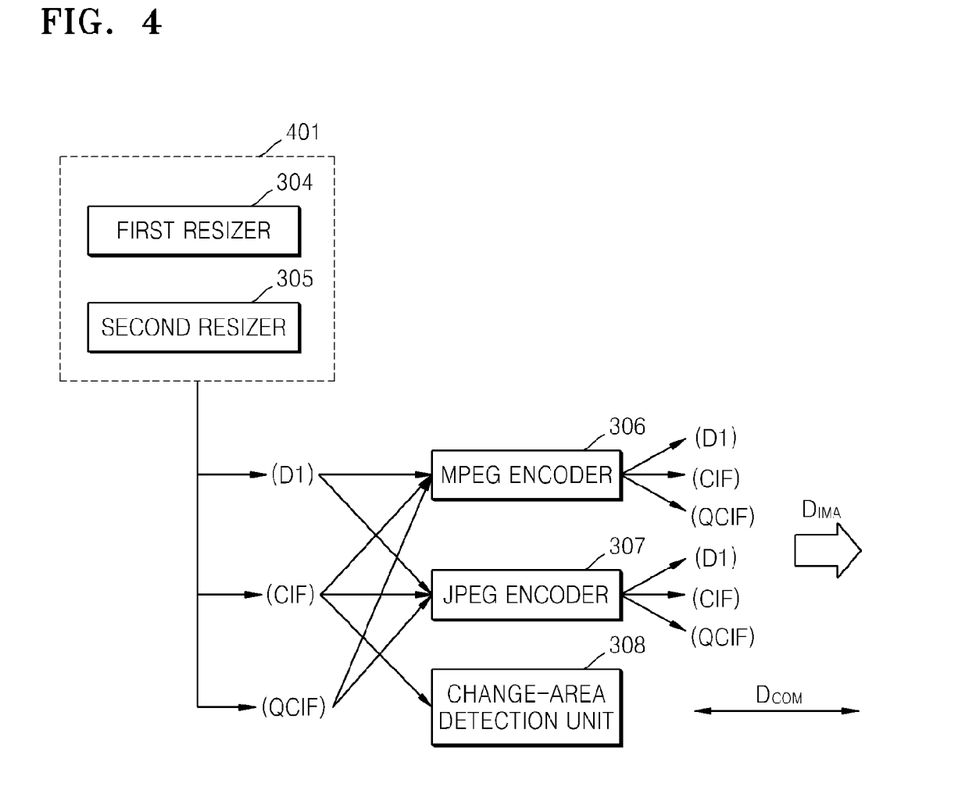
FIG. 4 is a block diagram illustrating a process of processing input image data in the DSP of FIG. 3, according to an exemplary embodiment.

FIG. 4 is a block diagram illustrating a process of processing input image data in the DSP 107 of FIG. 3.

Referring to FIGS. 3 and 4, the resolution of digital image data from the CDS-ADC 101 is converted into a plurality of resolutions (D1, CIF and QCIF) in a plurality of resizers 401 including the resizers 304 and 305. That is, the resolution of the digital image data from the CDS-ADC 101 is converted to a selection resolution selected by the computer (3a, 3b, or 3c of FIG. 1). The selection resolution may be determined by a user of the computer (3a, 3b, or 3c.

The resolution output in a plurality of resizers 401 is one of D1 resolution of 720×480, CIF resolution of 352×288, and QCIF resolution of 176×144.

As such, the MPEG encoder 306, which is a video encoder, compresses video data of one of the D1 resolution, the CIF resolution and the QCIF resolution. Furthermore, the JPEG encoder 406, which is a still image encoder, compresses still image data of one of the D1 resolution, the CIF resolution and the QCIF resolution.

However, the change-area detection unit 308, which requires a quick process time, analyzes the video data of the CIF resolution.

The core processor 301 communicates with computers 3a, 3b and 3c through the communication channel $D_{COM}$, and transmits moving-image compression data and still image compression data of various resolutions through the image data channel $D_{IMA}$. However, the core processor 301 may also transmit audio compression data or other data to the computers 3a, 3b and 3c through the image data channel $D_{IMA}$ or a separate channel (not shown). Such data is transmitted in a streaming scheme of a dedicated file format. Here, at least one of the communication channel $D_{COM}$, the image data channel $D_{IMA}$ and the separate channel, if any, may be formed by the Internet or an intranet.

Furthermore, the core processor 301 transmits information data of a change-area to the computers 3a, 3b and 3c through the image data channel $D_{IMA}$.

Furthermore, the core processor 301 generates a file of one of a plurality of file formats including a dedicated file format and a common file format within a flash memory (FM) (106 of FIG. 2), for example, a secure digital (SD) card, according to a user's selection, and records the obtained data in the generated file. Here, the user's selection signal may be provided from a computer (3a, 3b or 3c of FIG. 1).

Figure 5:
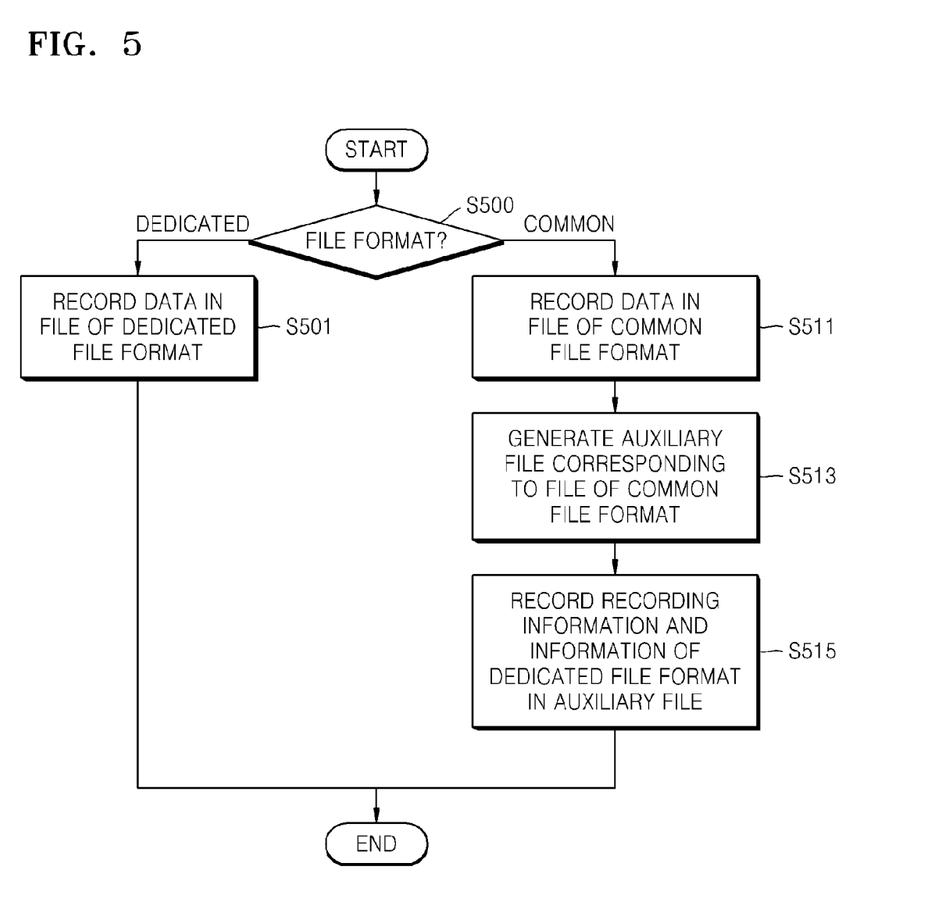
FIG. 5 is a flowchart illustrating an example of a moving-image data recording method performed by the DSP of FIG. 2, according to an exemplary embodiment.

FIG. 5 is a flowchart illustrating an example of a data recording method performed by the DSP 107 of FIG. 2. An example of a data recording method performed by the DSP 107 will be described below with reference to FIGS. 2 and 5.

First, the DSP 107 determines a file format selected by a user (S500).

If the file format is a dedicated file format, the DSP 107 generates a file of a dedicated file format, and records data in the generated file (S501). Here, the data includes video data and audio data not being limited thereto. In the present embodiment, the video data and the audio data may have been respectively compressed.

If the file format is a common file format, operations S511, S513 and S515 are performed. Some examples of the common file format are Audio Video Interleaved (AVI), MatrosKa Video (MKV), Moving Picture Experts Group-4 (MPEG-4), Window Media Video (WMV) and Moving Picture Experts Group-3 (MPEG-3).

In operation S511, the DSP 107 generates a file of a common file format, and records data in the generated file.

In operation S513, the DSP 107 generates an auxiliary file corresponding to the file of the common file format.

Furthermore, in operation S513, the DSP 107 records the recording information and information about the dedicated file format in the auxiliary file. Here, the recording information means recording information for reading data in a file of the common file format.

Figure 6:
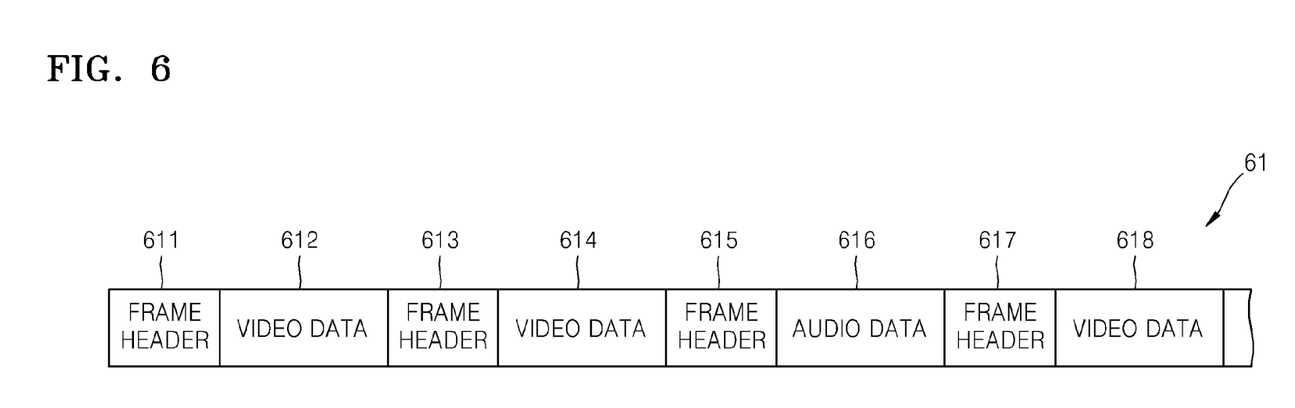
FIG. 6 is a block diagram illustrating an example where moving-image data is stored in a moving-image file of a dedicated file format by performance of operation S501 of FIG. 5, according to an exemplary embodiment.

FIG. 6 is a block diagram illustrating an example where data is stored in a file 61 of a dedicated file format by performance of operation S501 of FIG. 5.

Referring to FIG. 6, in the file 61 of the dedicated file format in the present embodiment, a unit frame includes frame header 611, 613, 615 or 617 and video data 612, 614 or 618 and audio data 616. A unit frame may include only the video data or the audio data among the video data and the audio data, according to an exemplary embodiment.

That is, the dedicated file format in the present embodiment is a format where frame headers 611, 613, 615 and 617 and data 612, 614, 616 and 618 are alternately disposed.

The frame header 611, 613, 615 or 617 includes information about a dedicated file format. Respective frame headers 611, 613, 615 and 617 include the same data.

Figure 7:
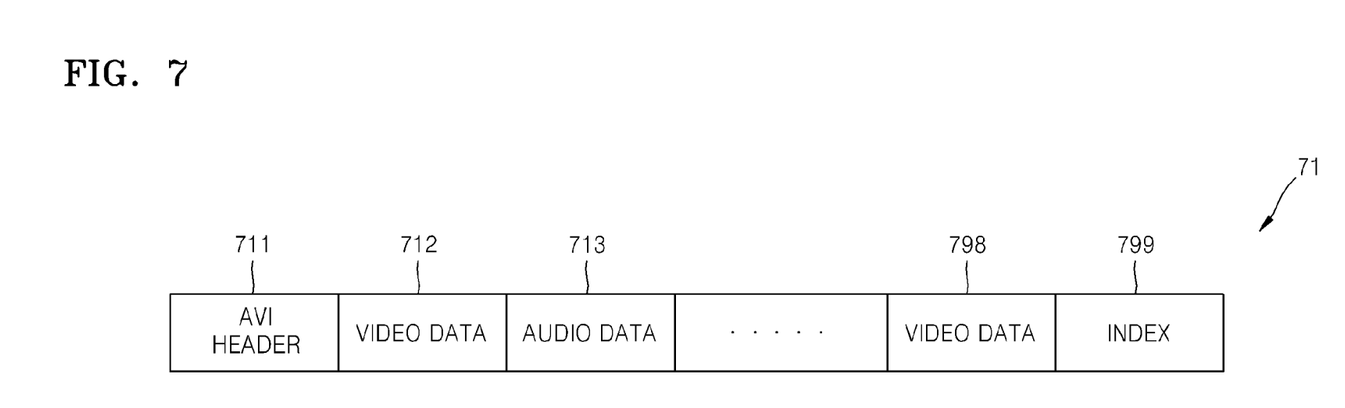
FIG. 7 is a block diagram illustrating an example where moving-image data is stored in a moving-image file of a common file format by performance of operation S511 of FIG. 5, according to an exemplary embodiment.

FIG. 7 is a block diagram illustrating an example where data is stored in a file 71 of a common file format by performance of operation S511 of FIG. 5. Here, an audio video interleaved (AVI) format, which is well known as a common file format, will be described as an example.

Referring to FIG. 7, the common file format includes an AVI header 711 at a beginning of each file 71 and an index 799 at an end of each file 71, and a series of frames of video data 712 and 798 and audio data 713 between the AVI header 711 and the index 799.

Figure 8:
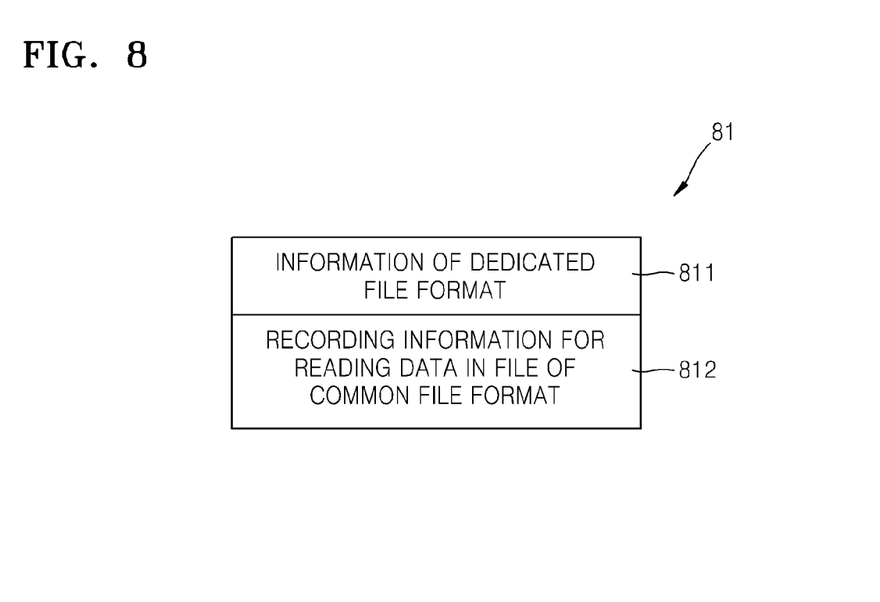
FIG. 8 is a block diagram illustrating information stored in an auxiliary file by performance of operations S513 and S515 of FIG. 5, according to an exemplary embodiment.

FIG. 8 is a block diagram illustrating information stored in an auxiliary file 81 by operations S513 and S515 of FIG. 5.

Referring to FIG. 8, information 811 of a dedicated file format and recording information 812 for reading data in a file (71 of FIG. 7) of a common file format are recorded in the auxiliary file 81.

Figure 9:
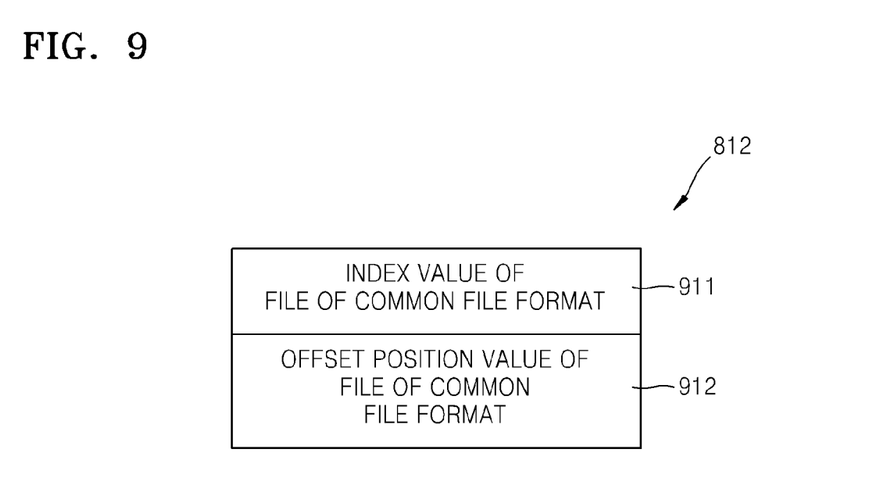
FIG. 9 is a block diagram illustrating an example of recording information of FIG. 8, according to an exemplary embodiment.

FIG. 9 is a block diagram illustrating an example of recording information of FIG. 8.

Referring to FIG. 9, recording information for reading data in the file (71 of FIG. 7) of a common file format includes an index value 911 and an offset position value 912 of the file of the common file format.

As is known well, the index value 911 and the offset position value 912 of the file are obtained in a process of recording data, and are used to read the data.

According to a recording method described with reference to FIGS. 5 to 9, if data 712 to 798 are recorded in the file 71 of a common file format by the operations S511, S513 and S515, the data 712 to 798 may be extracted or read using the recording information 812, and the extracted or read data 712 to 798 along with the information 811 of a dedicated file format may be transmitted to an external side, for example, the computer 3a, 3b or 3c. Here, the transmission of the data 712 to 798 along with the information 811 of the dedicated file format may be performed in a streaming scheme.

Here, the amount of the recording information 812 and the information 811 of the dedicated file format is much less than the data.

Hence, the file 71 of the common file format may be transmitted to an external side, for example, the computer (3a, 3b or 3c of FIG. 1), as streaming data of the dedicate file format while not causing a capacity problem of the recording medium (106 of FIG. 2).

Figure 10:
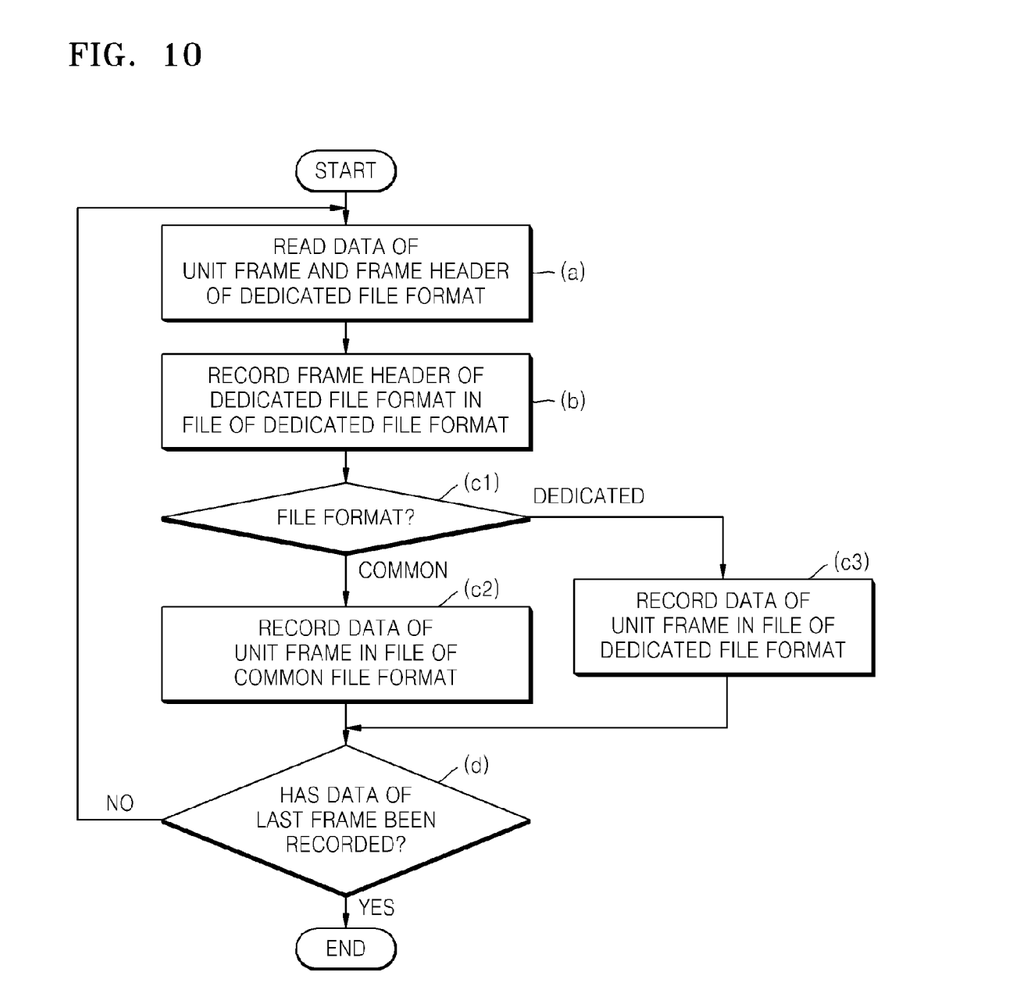
FIG. 10 is a flowchart illustrating another example of a moving-image data recording method performed by the DSP of FIG. 2, according to an exemplary embodiment.

FIG. 10 is a flowchart illustrating another example of a data recording method performed by the DSP 107 of FIG. 2.

Figure 11:
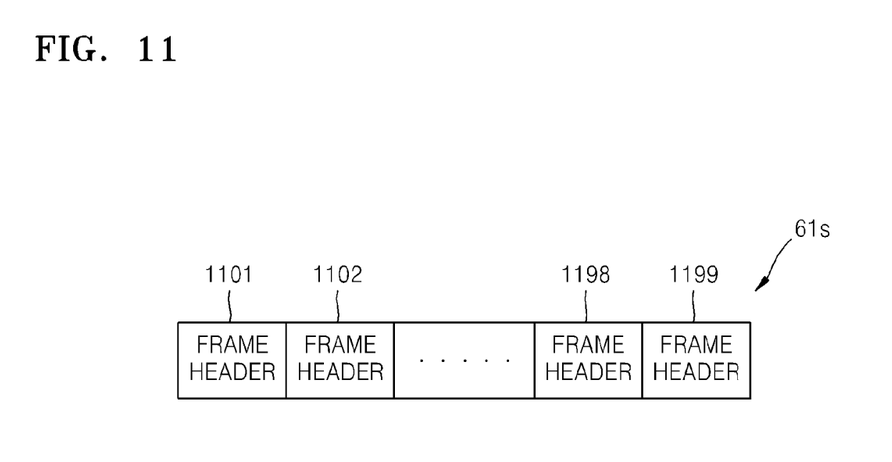
FIG. 11 is a block diagram illustrating a moving-image file of a dedicated file format generated as an auxiliary file when moving-image data is recorded in a moving-image file of a common file format by a recording method of FIG. 10, according to an exemplary embodiment.

FIG. 11 is a block diagram illustrating a file 61s of a dedicated file format, which is generated as an auxiliary file when data is recorded in a file (71 of FIG. 7) of a common file format by the recording method of FIG. 10.

Another example of a data recording method performed by the DSP 107 will be described below with reference to FIGS. 2, 6, 7, 10 and 11.

First, the DSP 107 reads data of a unit frame and a frame header of a dedicated file format (operation (a)).

Furthermore, the DSP 107 records the frame header (e.g., 1101) of the dedicated file format in the file 61s of the dedicated file format (operation (b)).

Information (811 of FIG. 8) of the dedicated file format and recording information (812 of FIG. 8) for reading data in the file 71 of the common file format are recorded in the frame header (e.g., 1101) of the dedicated file format.

The recording information for reading data in the file 71 of the common file format includes the index value (911 of FIG. 9) and the offset position value (912 of FIG. 9) of the file of the common file format. Likewise, the index value 911 and the offset value 912 of the file are obtained in a recording process of the data, and are used to read the data.

If the file format to be stored according to a user's selection is a common file format, the DSP 107 records the data (e.g., 712) of the unit frame in the file 71 of the common file format (operations (c1) and (c2)).

If the file format to be stored according to the user's selection is the dedicated file format, the DSP 107 records the data (e.g., 612) of the unit frame in the file (61s) of the dedicated file format (operations (c1) and (c2)). In the present embodiment, the dedicated file format is a format where the frame header 1101 to 1109 and data 612, 614, 616 and 618 are alternately disposed. Respective frame headers 1101 to 1109 include the same data.

Likewise, the data includes video data and audio data, and thus, the data (e.g., 612 or 712) of the unit frame is video data or audio data.

The operations (a) to (c3) are repeatedly performed until the data 798 or 618 of the last frame is recorded (operation (d)).

Hence, if the file format to be stored is a common file format, the file (61s) of the dedicated file format in the operation (b) becomes an auxiliary file corresponding to the file 71 of the common file format. Furthermore, if the file format to be stored is a dedicated file format, the file 61s of the dedicated file format in the operation (b) becomes a file 61 of the dedicated file format. Hence, the auxiliary file or file 61 of the dedicated file format may be generated using the file 61s.

Figure 12:
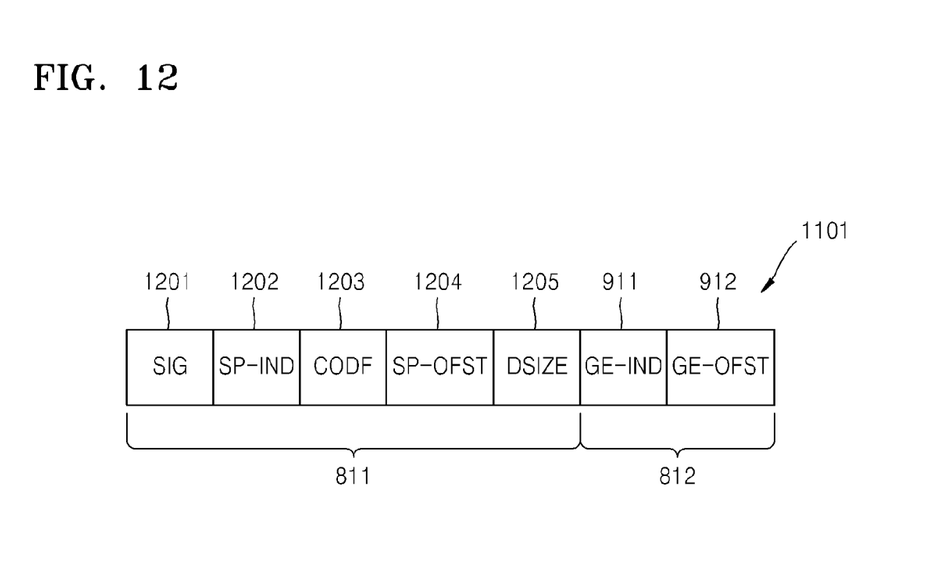
FIG. 12 is a block diagram illustrating data recorded in one of frame headers of FIG. 11, according to an exemplary embodiment.

FIG. 12 is a block diagram illustrating data recorded in one of frame headers of 1101 FIG. 11.

Referring to FIG. 12, the information 811 of the dedicated file format and recording information 812 for reading data in the file (71 of FIG. 7) of the common file format are recorded in the frame header 1101 of the dedicated file format.

The information 811 of the dedicated file format includes data 1201 (SIG) indicating a first position of a frame, an index value 1202 (SP-IND) of the file of the dedicated file format, a codec format 1203 (CODF) of data, an offset position value 1204 (SP-OFST) of the file of the dedicated file format, and a total size value 1205 (DSIZE) of the data.

Furthermore, the recording information 812 for reading data in the file 71 of the common file format includes the index value 911 (GE-IND) and the offset position value 912 (GE-OFST) of the file of the common file format.

Figure 13:
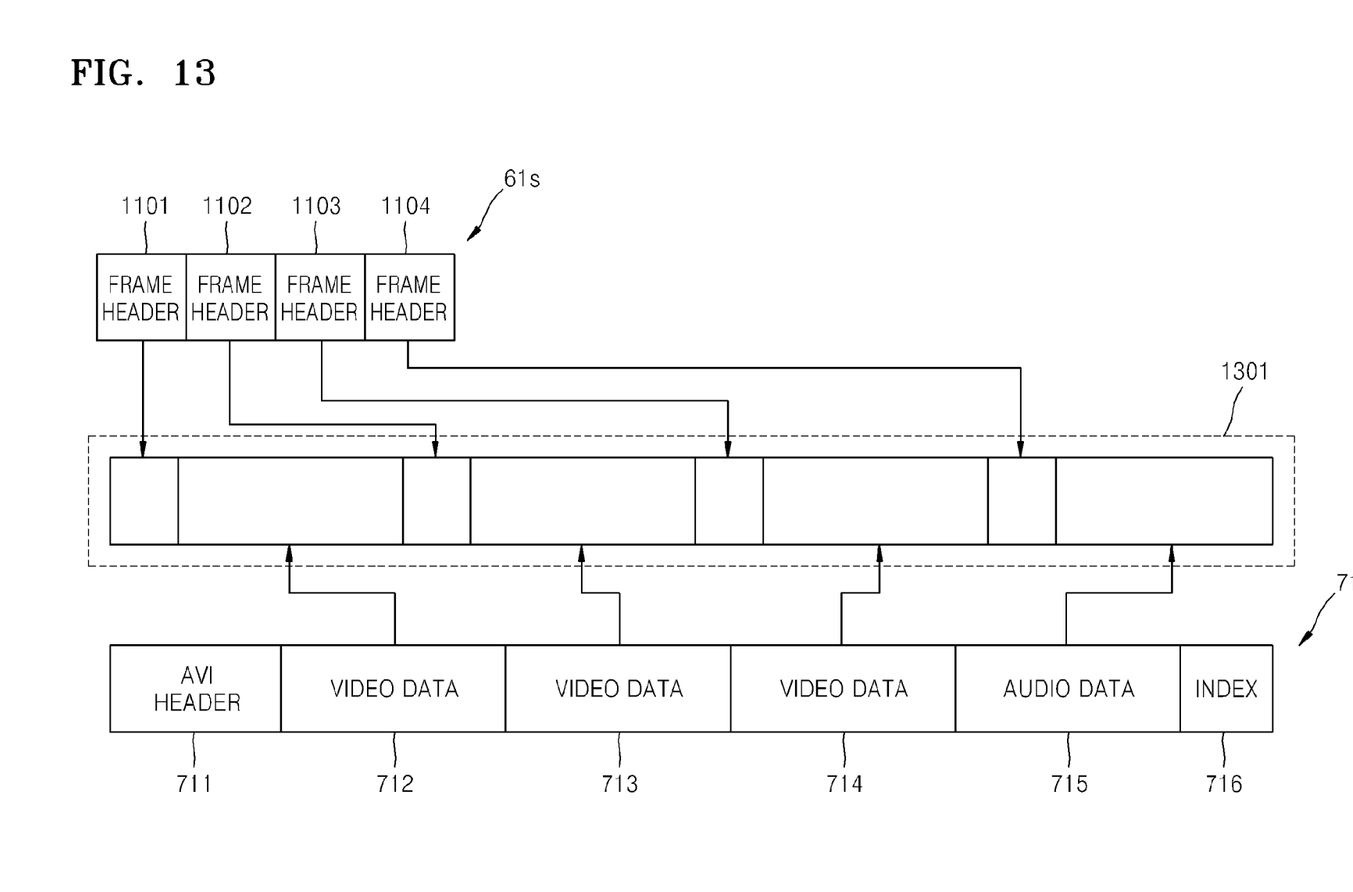
FIG. 13 is a block diagram illustrating a fact that streaming data of a dedicated file format may be transmitted by using a moving-image file of a dedicated file format generated as an auxiliary file if moving-image data is recorded in a moving-image file of a common file format by the recording method of FIG. 10, according to an exemplary embodiment.

FIG. 13 is a block diagram illustrating that streaming data of a dedicated file format may be transmitted by using a file 61s of a dedicated file format generated as an auxiliary file if data 712 to 715 is recorded in a file 71 of a common file format by the recording method of FIG. 10. In FIG. 13, the same reference numbers used also in FIGS. 7 and 11 refer to the same objects having the same function.

Referring to FIG. 13, if the data 712 to 715 are recorded in the file 71 of the common file format, the data 712 to 715 may be extracted by the recording information recorded in the file 61s of the dedicated file format generated as an auxiliary file. Furthermore, the extracted data 712 along with the frame headers 1101 to 1104 may constitute a file 1301 of the dedicated file format to be transmitted to an external side as information about the dedicated file format.

Likewise, the dedicated file format is a format where the frame headers 1101 to 1109 and data 612, 614, 616 and 618 are alternately disposed. Respective frame headers 1101 to 1109 include the same data. In FIG. 13, the dedicated file format is implemented by disposing the data 712 to 715 and the frame headers 1101 to 1109 alternately.

Here, the amount of the recording information and the information about the dedicated file format recorded in respective frame headers 1101 to 1109 is much less than the data.

Hence, the file 71 of the common file format may be transmitted to an external side, for example, the computers (3a to 3c of FIG. 2) as streaming data of the dedicated file format while not causing a capacity problem of the recording medium (e.g., 106 of FIG. 2).

Figure 14:
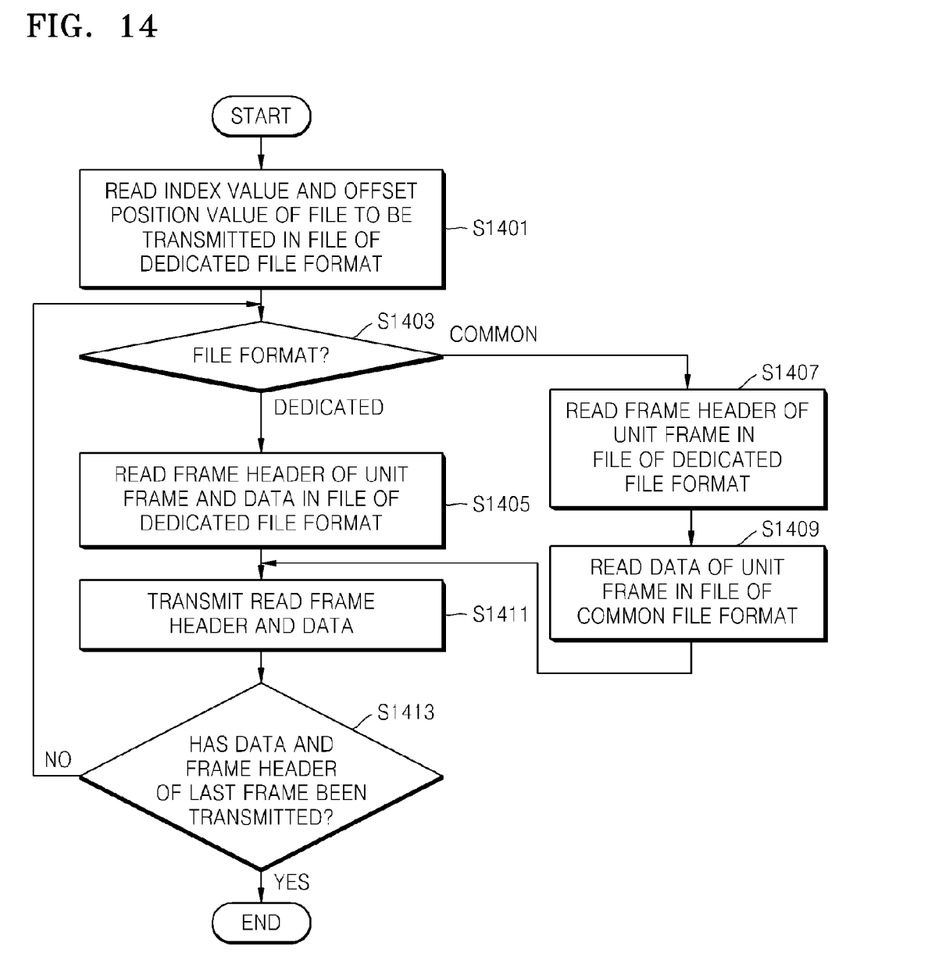
FIG. 14 is a flowchart illustrating an example of a moving-image data transmission method performed by the DSP of FIG. 2, according to an exemplary embodiment.

FIG. 14 is a flowchart illustrating an example of a data transmission method performed by the DSP 107 of FIG. 2. An example of a data transmission method performed by the DSP 107 will be described below with reference to FIGS. 6, 7, 13 and 14.

First, the DSP 107 reads the index value 1202 or 911 and the offset position value 1204 or 912 of a file to be transmitted, in the file 61s or 61 of the dedicated file format (S1401).

If a format of the file to be transmitted is a common file format, a file of the dedicated file format in operation S1401 corresponds to reference numeral 61s of FIG. 11 as an auxiliary file. If the format of the file to be transmitted is a dedicated file format, the file of the dedicated file format in operation S1401 corresponds to reference numeral 61 of FIG. 6.

Next, if the format of the file to be transmitted is a common file format (S1403), the DSP 107 performs the following operations.

The DSP 107 reads the frame header (e.g., 1101) of the unit frame in the file 61s of the dedicated file format (S1407).

As such, the DSP 107 reads the data (e.g., 712) of the unit frame in the file 71 of the common file format (S1409).

Next, the DSP 107 transmits the read frame header and data (e.g., 1101 and 712) to an external side, for example, the computer (3a to 3c of FIG. 2) (S1411).

The operations S1407, S1409 and S1411 are repeatedly performed until the frame header and data (e.g., 1104 and 715) of the final frame are transmitted (S1413).

Furthermore, if the format of the file to be transmitted is a dedicated file format (S1403), the DSP 107 performs the following operations.

The DSP 107 reads the frame header (e.g., 611) and data (e.g., 612) in the file 61 of the dedicated file format (S1405).

Next, the DSP 107 transmits the read frame header and the data (e.g., 611 and 612) to an external device, for example, the computer (3a to 3c of FIG. 2) (S1411).

The operations S1405 and S1411 are repeatedly performed until the frame header and date (e.g., 617 and 618) of the last frame are transmitted (S1413).

According to a method of recording data and a photographing apparatus adopting the method of exemplary embodiments, an auxiliary file corresponding to the file of a common file format is generated, and information about the dedicated file format and recording information for reading data in the file of the common file format are recorded in the auxiliary file.

Hence, if data is recorded in a file of the common file format, the data may be extracted by using the recording information, and the extracted data along with the information about the dedicated file format may be transmitted to an external device, for example, a computer.

Here, the amount of the recording information and the information about the dedicated file format is significantly less than the amount of the data.

Therefore, the file of a common file format may be transmitted to an external device as streaming data of a dedicated file format while not causing a capacity problem to arise in recording media.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A method of data processing in a surveillance camera which comprises an image sensor and a hardware signal processor, the method comprising:
   controlling the hardware signal processor to determine a file format, in which data output from the image sensor is to be recorded in a file, among a plurality of file formats comprising a dedicated file format and a common file format; and
   in response to the file format being determined as the common file format, controlling the hardware signal processor to record the data in a file of the common file format, generate an auxiliary file of the dedicated file format, and record, in the auxiliary file, information about the dedicated file format and recording information required for reading the data recorded in the file of the common file format, the recording information comprising an index value and an offset position value of the data in the file of the common file format; and
   controlling the hardware signal processor to extract a data unit of the data recorded in the file of the common file format by using the recording information in the auxiliary file of the dedicated file format, extract the information recorded in the auxiliary file of the dedicated file format, and stream the file by alternately transmitting the data unit and the information through a network to a receiver operating according to a dedicated program corresponding to the dedicated file format,
   wherein the file of the common file format and the auxiliary file of the dedicated file format are recorded in a memory of the surveillance camera which obtains the data, and
   wherein the dedicated file format is a format where frame headers and the data are alternately disposed, each of the frame headers containing same information.

2. The method of claim 1, further comprising compressing the data by encoding the data before the data is recorded in the file of the common file format.

3. The method of claim 2, wherein the dedicated file format is a file format having a file extension "dat" for the file, and wherein the common file format is one of Audio Video Interleaved (AVI), MatrosKa Video (MKV), Moving Picture Experts Group-4 (MPEG-4), Window Media Video (WMV) and MPEG-3.

4. The method of claim 1, further comprising controlling the hardware signal processor to record the data in a file of the dedicated file format if the dedicated file format is determined in the determining the file format.

5. The method of claim 4, wherein the controlling the hardware signal processor to stream the file comprises controlling the hardware signal processor to:

read and transmit the data and the frame header in the file of the dedicated file format from the surveillance camera to the receiver through a network, wherein the dedicated file format is recorded in a memory of the surveillance camera which obtains the data.

6. The method of claim 5, wherein the dedicated file format is a file format having a file extension "dat" for the file, and wherein the common file format is one of Audio Video Interleaved (AVI), MatrosKa Video (MKV), Moving Picture Experts Group-4 (MPEG-4), Window Media Video (WMV) and MPEG-3.

7. A surveillance camera comprising:

an image sensor configured to output data corresponding to at least a captured image; and a hardware signal processor configured to determine a file format, in which the data is to be recorded in a file, among a plurality of file formats comprising a dedicated file format and a common file format, wherein, in response to the file format being determined as the common file format, the hardware signal processor is configured to record the data in a file of the common file format, generate an auxiliary file of the dedicated file format, and record, in the auxiliary file, information about the dedicated file format and recording information required for reading the data recorded in the file of the common file format, the recording information comprising an index value and an offset position value of the data in the file of the common file format, and wherein the hardware signal processor is further configured to extract a data unit of the data recorded in the file of the common file format by using the recording information in the auxiliary file of the dedicated file format, extract the information recorded in the auxiliary file of the dedicated file format, and stream the file by alternately transmitting the data unit and the information through a network to a receiver operating according to a dedicated program corresponding to the dedicated file format, wherein the file of the common file format and the auxiliary file of the dedicated file format are recorded in a memory of the surveillance camera which obtains the data, and wherein the dedicated file format is a format where frame headers and the data are alternately disposed, each of the frame headers containing same information.

8. The surveillance camera claim 7, wherein the hardware signal processor is further configured to compress the data by encoding the data before the data is recorded in the file of the common file format.

9. The surveillance camera of claim 8, wherein the dedicated file format is a file format having a file extension "dat" for the file, and wherein the common file format is one of Audio Video Interleaved (AVI), MatrosKa Video (MKV), Moving Picture Experts Group-4 (MPEG-4), Window Media Video (WMV) and MPEG-3.

10. The surveillance camera of claim 7, wherein the hardware signal processor is further configured to record the data in a file of the dedicated file format if the dedicated file format is determined in the determining the file format.

11. The surveillance camera of claim 10, wherein the hardware signal processor is further configured to read and transmit the data and the frame header in the file of the dedicated file format from the surveillance camera to the receiver through a network in a streaming scheme.

12. The surveillance camera of claim 11, wherein the dedicated file format is a file format having a file extension "dat" for the file, and wherein the common file format is one of Audio Video Interleaved (AVI), MatrosKa Video (MKV), Moving Picture Experts Group-4 (MPEG-4), Window Media Video (WMV) and MPEG-3.

13. The method of claim 1, wherein the information about the dedicated file format includes:

data indicating a first position of the frame;

an index value of a moving-image file of the dedicated file format;

a codec format of moving-image data;

an offset position value of the moving-image file of the dedicated file format; and a total size value of the moving-image data.

14. The surveillance camera of claim 7, wherein the information about the dedicated file format includes:

data indicating a first position of the frame;

an index value of a moving-image file of the dedicated file format;

a codec format of moving-image data;

an offset position value of the moving-image file of the dedicated file format; and a total size value of the moving-image data.

* * * * *